Feb. 22, 1927. 1,618,819
G. W. EMERT
DEVICE FOR COUPLING ALEMITE VALVES TO SPEEDOMETER CABLES
Filed Aug. 18, 1926
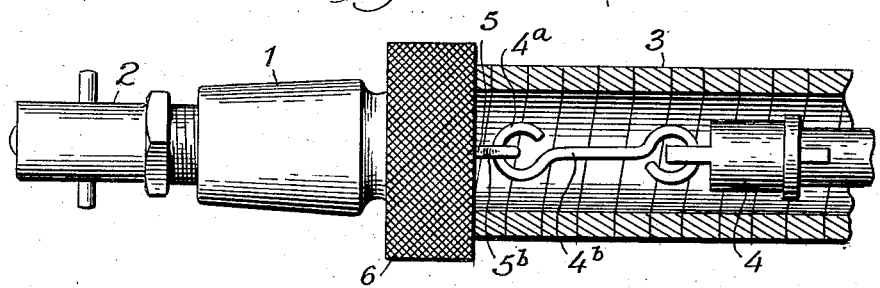
Fig. 1.
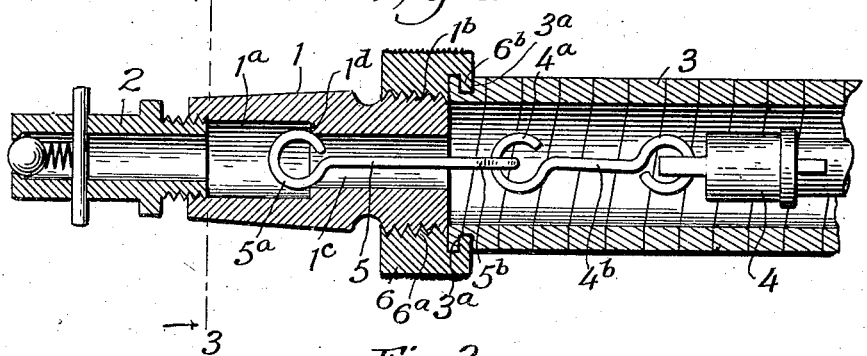
Fig. 2.
Fig. 3.
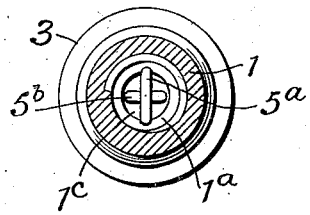
INVENTOR.
George W. Emert
BY Alexander & Dowell
ATTORNEYS Patented Feb. 22, 1927.

1,618,819

UNITED STATES PATENT OFFICE.

GEORGE W. EMERT, OF ENDICOTT, NEW YORK.

DEVICE FOR COUPLING ALEMITE VALVES TO SPEEDOMETER CABLES.

Application filed August 18, 1926. Serial No. 130,017.

This invention is a novel device for coupling an alemite or other high pressure valve to a speedometer or other flexible cable, for use in applying lubricant to the casings of such flexible cables, my device permitting the cable to be filled with grease or other lubricant from a suitable grease gun or other supply of lubricant under pressure.

Another object of the invention is to provide a novel coupling device having means for preventing the end of the flexible cable or shaft from receding within the casing while the casing is being filled with lubricant.

Heretofore, when it has been necessary to fill or refill speedometer cables with grease or lubricant, the work has been very difficult to perform owing to the resistance of the flow of grease past the links of the flexible shaft within the casing, and furthermore it has been difficult to prevent the grease from forcing the end of the shaft inwardly in the casing to such point as to be inaccessible after the greasing operation.

My simple device however maintains the end of the shaft in its proper position in the casing, and permits grease to be applied under pressure to the cable in order to thoroughly fill same with lubricant.

I will explain the invention with reference to the accompanying drawing which illustrates one practical embodiment thereof, to enable others to adopt and use the same, and will summarize in the claims the novel features of construction, and novel combinations of parts, for which protection is desired.

In the drawing:—

Fig. 1 is a longitudinal part sectional view showing the coupling device, nipple, and the adjacent end of the flexible shaft casing.

Fig. 2 is a longitudinal sectional view therethrough.

Fig. 3 is a section on line 3—3, Fig. 2.

As shown in the drawing, my novel coupling device preferably comprises a tubular body 1 having a stepped bore therein, the outer and larger portion $1^a$ of the stepped bore being tapped in order to receive the threaded end of the usual alemite or other high pressure nipple 2; the nipple having means thereon for connection with the ordinary grease gun.

The opposite end of the body 1 is externally threaded as at $1^b$ and adapted to enter the tapped bore $6^a$ of a knurled ferrule 6, mounted in any suitable manner on the end of the casing 3 in which the flexible shaft 4 rotates. As shown in Fig. 2, ferrule 6 is provided at its inner end with an internal annular flange or shoulder $6^b$ adapted to fit in a correspondingly shaped circumferential groove $3^a$ in the exterior surface of casing 3 adjacent the end thereof. Within the smaller step $1^c$ of the bore of body 1 is a member 5 preferably of stiff wire, having its inner end bent to form a loop $5^a$ of larger diameter than step $1^c$, which loop fits within the larger step $1^a$ of the bore of body 1 and is prevented from being drawn through the smaller step $1^c$ by the internal shoulder $1^d$ formed by the steps $1^a$ and $1^c$. The opposite end of member 5 is provided with an eye $5^b$ extending beyond the end of the member 1 and adapted to enter into the end of casing 3, said eye $5^b$ being adapted to receive the usual hooked end $4^a$ of the link member $4^b$ of the flexible shaft 4, whereby when the hooked end $4^a$ is so engaged with the eye $5^b$ the flexible shafting 4 will be prevented from receding within the casing 3 and from becoming inaccessible.

In operation when it is desired to fill the casing 3 of the flexible shaft with lubricant, the casing 3 and link $4^b$ should be disconnected from their usual connections in the shaft assembly and body 1 placed adjacent the tapped end of ferrule 6. The hooked end $4^a$ of link $4^b$ should then be engaged with the eye $5^b$ at the end of member 5, and body 1 should then be screwed into the end of ferrule 6 connecting same with the casing 3, and the alemite nipple 2 screwed into the outer end of body 1 and engaged with the grease gun. When so engaged, the lubricant will pass through the nipple 2, body 1, and into casing 3 and will completely fill the casing. While the casing 3 is being filled, the end of flexible shafting 4 is securely held by the member 5 and prevented from receding within the casing 3. After the casing has been completely filled, body 1 may then be disconnected from the ferrule 6 and casing 3; also hook $4^a$ of link $4^b$ disconnected from eye 5, and the flexible shafting 4 and casing 3 again adjusted to their normal positions and connections in the shaft assembly.

I do not limit my invention to the exact details shown in the drawing, for obviously changes may be made therein within the scope of the claims.

I claim:—

1. A coupling device for use in filling flexible shaft casings with lubricant, comprising a hollow body having one end adapted to be engaged with a grease gun, and the opposite end adapted to be engaged with a flexible shaft casing; and means on the device for engaging the flexible shaft to prevent axial movement thereof within the casing.

2. A coupling device for use in filling flexible shaft casings with lubricant, comprising a hollow body having one end adapted to receive a lubricating nipple; and the opposite end adapted to be engaged with a flexible shaft casing; and means in the body for engaging the end of the flexible shaft to prevent axial movement of the shaft in the casing during the lubrication thereof.

3. A coupling device for use in filling flexible shaft casings with lubricant, comprising a body having a bore, the outer end of the body being adapted to be engaged with a grease gun; the inner end of said body being adapted to be engaged with the flexible shaft casing; and a fixed member within the bore having means for engagement with the end of the flexible shaft.

4. A coupling device for use in filling flexible shaft casings with lubricant, comprising a tubular body, the outer end of the body being adapted to be engaged with a grease gun; the inner end of said body being adapted to be engaged with the flexible shaft casing; and a member fixed within the bore having an eye on its outer end adapted to be engaged with the end of the flexible shaft.

5. A coupling device for use in filling flexible shaft casings with lubricant, comprising a tubular body having a stepped bore, the end of the body adjacent the larger step being adapted to be engaged with a grease gun; the opposite end of said body being adapted to be engaged with the flexible shaft casing; and a member extending through the smaller step of the bore and having a loop on its inner end of larger diameter than the smaller step, said loop lying within the larger step; and said member having an eye on its outer end adapted to be engaged with the end of the flexible shaft.

6. A coupling device for use in filling flexible shaft casings with lubricant, comprising a tubular body having a stepped bore, the outer end of the larger step being tapped, and adapted to receive the threaded end of a high pressure nipple; the inner end of said body being externally threaded and adapted to be engaged with the bore of a flexible shaft casing; and a member extending through the smaller step of the bore and having a loop on its inner end of larger diameter than the smaller step, said loop lying within the larger step; and said member having an eye on its outer end adapted to be engaged with the adjacent end of the flexible shafting within the casing.

In testimony that I claim the foregoing as my own, I affix my signature.

GEORGE W. EMERT.